US011962214B2

United States Patent
Holzleitner

(10) Patent No.: US 11,962,214 B2
(45) Date of Patent: Apr. 16, 2024

(54) TRANSPORT DEVICE

(71) Applicant: B&R INDUSTRIAL AUTOMATION GMBH, Eggelsberg (AT)

(72) Inventor: Alois Holzleitner, Braunau am Inn (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 360 days.

(21) Appl. No.: 17/614,411

(22) PCT Filed: May 28, 2020

(86) PCT No.: PCT/EP2020/064877
§ 371 (c)(1),
(2) Date: Nov. 26, 2021

(87) PCT Pub. No.: WO2020/239930
PCT Pub. Date: Dec. 3, 2020

(65) Prior Publication Data
US 2022/0239213 A1 Jul. 28, 2022

(30) Foreign Application Priority Data
May 28, 2019 (AT) .............................. A 50488/2019

(51) Int. Cl.
*H02K 41/00* (2006.01)
*B65G 54/02* (2006.01)
*H02K 41/03* (2006.01)

(52) U.S. Cl.
CPC ........... *H02K 41/031* (2013.01); *B65G 54/02* (2013.01); *H02K 2201/18* (2013.01)

(58) Field of Classification Search
CPC .... H05K 5/0204; H02K 41/02; H02K 41/031; H02K 41/033; H02K 1/148; H02K 1/12;
(Continued)

(56) References Cited

U.S. PATENT DOCUMENTS 3,967,147 A * 6/1976 Preiser ................... H02K 5/167
310/71
4,893,048 A * 1/1990 Farrall .................... H01H 57/00
310/331

(Continued)

FOREIGN PATENT DOCUMENTS

CN 108946032 12/2018
CN 109217768 1/2019
(Continued)

OTHER PUBLICATIONS

Translation of Notification of First Office Action conducted in counterpart China Appln. No. 202080039194 (dated Feb. 17, 2023).
(Continued)

*Primary Examiner* — Maged M Almawri
(74) *Attorney, Agent, or Firm* — GREENBLUM & BERNSTEIN, P.L.C.

(57) ABSTRACT

In order to provide a transport device having a planar motor, which gives greater flexibility in the movement of the transport units, at least one multiple-action transport unit is provided on the transport device. On the multiple-action transport unit, at least first drive magnets for electromagnetic interaction with the drive coils of a first planar motor and at least second drive magnets for electromagnetic interaction with the drive coils of a second planar motor are provided. The multiple-action transport unit can be moved two-dimensionally on the transport plane of one of the planar motors, or can be moved simultaneously, unidimensionally on neighboring transport planes of the first and second planar motor.

11 Claims, 5 Drawing Sheets

Figure 1A:
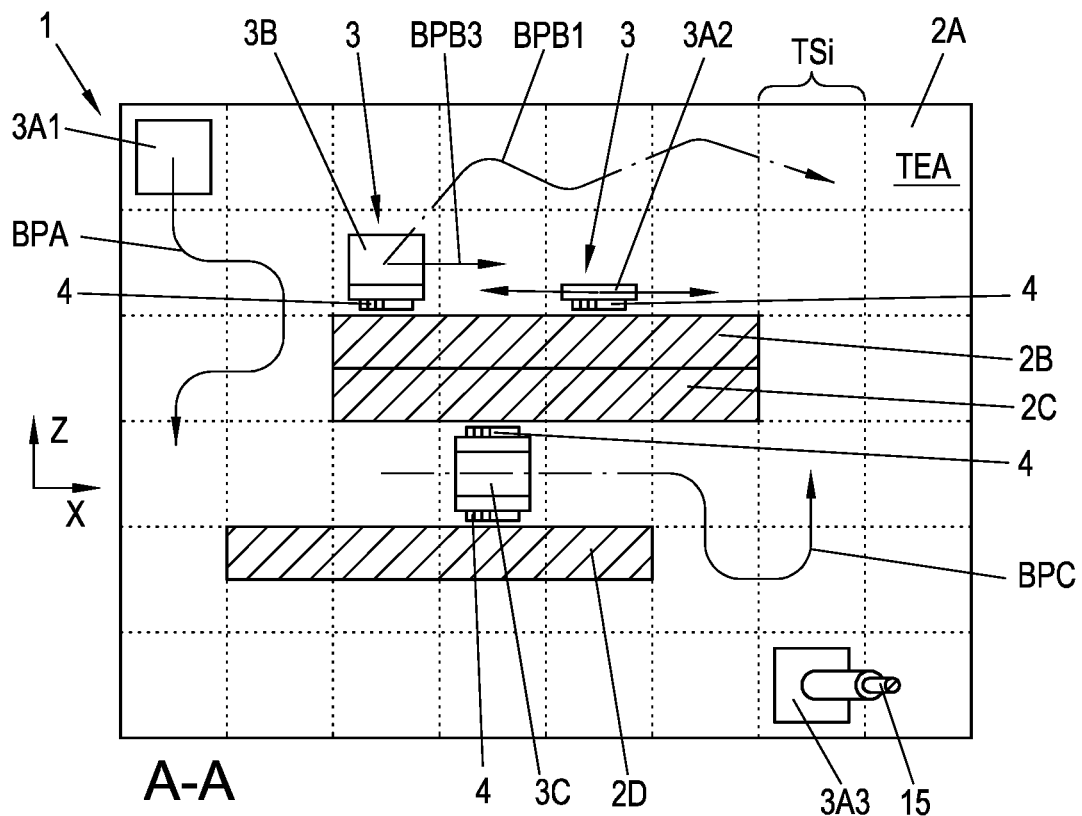

(58) Field of Classification Search
CPC . H02K 2201/15; H02K 2201/18; B65G 54/02
USPC ........ 310/12.15, 12.24, 12.05, 12.07, 12.09,
310/12.14, 12.11, 12.02, 12.25, 216.099,
310/216.101, 216.102, 216.103, 12.13
See application file for complete search history.

(56) References Cited

U.S. PATENT DOCUMENTS

| | | | | |
|---|---|---|---|---|
| 5,235,225 | A * | 8/1993 | Colgate | H02N 1/004 310/22 |
| 5,304,970 | A * | 4/1994 | Okamoto | H01H 51/229 335/78 |
| 5,757,255 | A * | 5/1998 | Noda | H01H 50/642 335/78 |
| 5,838,085 | A * | 11/1998 | Roesel, Jr. | H02K 16/00 310/112 |
| 5,856,722 | A * | 1/1999 | Haronian | H03H 9/50 310/309 |
| 5,909,162 | A * | 6/1999 | Ikeda | H01H 1/56 335/133 |
| 5,990,590 | A * | 11/1999 | Roesel, Jr. | H02K 7/025 310/112 |
| 6,000,280 | A * | 12/1999 | Miller | G01B 5/28 977/872 |
| 6,107,903 | A * | 8/2000 | Sako | H01H 51/229 335/78 |
| 6,115,231 | A * | 9/2000 | Shirakawa | H01H 59/0009 361/233 |
| 6,153,839 | A * | 11/2000 | Zavracky | H01H 59/0009 200/181 |
| 6,507,475 | B1 * | 1/2003 | Sun | H01L 27/0805 257/E27.048 |
| 6,608,542 | B2 * | 8/2003 | Pietsch | H01H 50/28 335/274 |
| 6,686,820 | B1 * | 2/2004 | Ma | H01H 59/0009 333/262 |
| 6,740,946 | B2 * | 5/2004 | Funaki | H01H 59/0009 257/458 |
| 6,806,545 | B2 * | 10/2004 | Shim | H01H 59/0009 257/415 |
| 6,812,814 | B2 * | 11/2004 | Ma | H01H 59/0009 333/262 |
| 6,815,866 | B2 * | 11/2004 | Lee | B81C 1/0015 310/309 |
| 7,023,603 | B2 * | 4/2006 | Reboa | G02B 26/0841 359/254 |
| 7,053,736 | B2 * | 5/2006 | Nelson | H01H 59/0009 335/70 |
| 7,126,447 | B2 * | 10/2006 | Kawai | H01H 59/0009 335/78 |
| 7,242,273 | B2 * | 7/2007 | Isobe | H01P 1/127 335/78 |
| 7,321,275 | B2 * | 1/2008 | Chou | B81B 3/0013 333/262 |
| 7,355,258 | B2 * | 4/2008 | Valenzuela | H01H 1/0094 333/262 |
| 7,368,846 | B2 * | 5/2008 | Mushika | G02B 26/0841 318/116 |
| 7,605,503 | B2 * | 10/2009 | El-Rafai | H02K 1/12 310/68 C |
| 7,709,757 | B2 * | 5/2010 | Charvet | H01H 59/0009 361/207 |
| 7,728,703 | B2 * | 6/2010 | Kim | H01P 1/127 29/846 |
| 7,745,747 | B2 * | 6/2010 | Carmona | H01H 59/0009 335/78 |
| 7,782,170 | B2 * | 8/2010 | Robert | H01H 59/0009 337/365 |
| 8,138,655 | B2 * | 3/2012 | Ikehashi | H02N 1/006 361/278 |
| 8,294,539 | B2 * | 10/2012 | Ellis | H01H 1/0036 335/78 |
| 8,729,770 | B1 * | 5/2014 | Milanovic | G02B 26/0841 310/40 MM |
| 8,772,999 | B2 * | 7/2014 | Mohanty | H03H 9/2405 310/309 |
| 8,796,907 | B2 * | 8/2014 | Galchev | H02K 35/02 310/319 |
| 8,946,966 | B2 * | 2/2015 | Shimizu | H02K 21/028 310/191 |
| 9,202,719 | B2 | 12/2015 | Lu et al. | |
| 9,346,371 | B2 * | 5/2016 | King | B60L 13/10 |
| 9,413,200 | B2 * | 8/2016 | Horisaka | H02K 3/02 |
| 9,583,294 | B2 * | 2/2017 | Lee | H01H 1/0036 |
| 9,748,048 | B2 * | 8/2017 | Fitzgerald | H01H 59/0009 |
| 9,856,096 | B2 * | 1/2018 | Hanisch | H02K 41/02 |
| 10,454,355 | B2 | 10/2019 | Weber | |
| 10,562,720 | B2 | 2/2020 | Yamamoto | |
| 10,737,810 | B2 * | 8/2020 | Franke | B65B 3/28 |
| 10,917,027 | B2 | 2/2021 | Weber et al. | |
| 11,393,707 | B2 | 7/2022 | Ahn | |
| 11,713,147 | B2 * | 8/2023 | Duperray | B65B 21/06 198/469.1 |
| 11,855,557 | B2 * | 12/2023 | Luthe | H02P 25/064 |
| 2003/0042117 | A1 * | 3/2003 | Ma | H01H 59/0009 200/181 |
| 2003/0098660 | A1 * | 5/2003 | Erdman | H02K 1/2726 310/68 B |
| 2003/0132822 | A1 * | 7/2003 | Ko | H01H 53/06 335/78 |
| 2003/0169146 | A1 * | 9/2003 | Kawai | H01H 59/0009 337/377 |
| 2003/0183887 | A1 * | 10/2003 | Lee | B81B 3/0078 438/48 |
| 2003/0230941 | A1 * | 12/2003 | Jacobs | B65G 47/841 310/12.19 |
| 2004/0008097 | A1 * | 1/2004 | Ma | H01H 59/0009 333/262 |
| 2004/0050674 | A1 * | 3/2004 | Rubel | H01H 50/005 200/181 |
| 2004/0050675 | A1 * | 3/2004 | Feng | H01H 59/0009 200/181 |
| 2004/0061579 | A1 * | 4/2004 | Nelson | H01H 59/0009 335/78 |
| 2004/0113727 | A1 * | 6/2004 | Kawai | H01P 1/127 335/78 |
| 2004/0251765 | A1 * | 12/2004 | Dooley | H02K 11/27 310/214 |
| 2005/0012562 | A1 * | 1/2005 | Shin | H01H 59/0009 333/262 |
| 2006/0145793 | A1 * | 7/2006 | Ning | H01H 59/0009 335/78 |
| 2006/0181377 | A1 * | 8/2006 | Kweon | H01H 59/0009 335/78 |
| 2006/0290443 | A1 * | 12/2006 | Chou | H01H 59/0009 333/105 |
| 2007/0007827 | A1 * | 1/2007 | Harris | H02K 35/04 290/1 R |
| 2008/0042509 | A1 * | 2/2008 | Dooley | H02K 21/028 310/156.01 |
| 2008/0047809 | A1 * | 2/2008 | Lisec | H01P 1/127 29/622 |
| 2008/0143196 | A1 * | 6/2008 | Sprague | G02B 26/0858 310/36 |
| 2008/0143207 | A1 * | 6/2008 | Shah | H02K 21/16 310/156.08 |
| 2008/0190748 | A1 * | 8/2008 | Arthur | H01L 24/24 29/622 |
| 2008/0238217 | A1 * | 10/2008 | Shah | H02K 21/12 310/156.01 |
| 2008/0238220 | A1 * | 10/2008 | El-Rafaie | H02K 1/12 310/48 |
| 2008/0238233 | A1 * | 10/2008 | El-Rafai | H02K 1/12 310/152 |
| 2008/0265710 | A1 * | 10/2008 | Ikehashi | H01G 5/16 310/309 |
| 2009/0033158 | A1 * | 2/2009 | Sato | H02K 41/02 310/28 |

(56) References Cited

U.S. PATENT DOCUMENTS

| | | | | |
|---|---|---|---|---|
| 2009/0127082 | A1* | 5/2009 | Zhang | H01H 59/0009 200/181 |
| 2009/0256297 | A1* | 10/2009 | Geisberger | G01P 15/125 267/160 |
| 2009/0261689 | A1* | 10/2009 | Fang | H02K 53/00 310/329 |
| 2009/0273254 | A1* | 11/2009 | Heim | H02K 15/12 310/195 |
| 2009/0315425 | A1* | 12/2009 | Zhang | H02K 55/04 310/194 |
| 2009/0322184 | A1* | 12/2009 | Carman | H02N 2/186 310/339 |
| 2010/0060107 | A1* | 3/2010 | Seki | H02N 2/004 310/323.16 |
| 2010/0116632 | A1* | 5/2010 | Smith | G01P 15/0802 257/368 |
| 2010/0155202 | A1* | 6/2010 | Ellis | H01H 11/00 29/622 |
| 2010/0180456 | A1* | 7/2010 | Laabs | G01C 1/02 310/91 |
| 2010/0186618 | A1* | 7/2010 | King | B60L 13/003 701/19 |
| 2010/0187076 | A1* | 7/2010 | Goggin | B81B 7/0012 200/283 |
| 2010/0187917 | A1* | 7/2010 | Zhu | G03F 7/70758 310/12.06 |
| 2010/0219722 | A1* | 9/2010 | Onishi | H04R 17/00 310/348 |
| 2010/0295639 | A1* | 11/2010 | Kawabata | B81B 3/0037 335/106 |
| 2011/0100252 | A1* | 5/2011 | Fukukawa | H02K 41/031 104/293 |
| 2011/0100793 | A1* | 5/2011 | Ziaei | H01P 1/127 977/932 |
| 2012/0068278 | A1* | 3/2012 | Knipe | H01H 1/0036 257/E21.52 |
| 2012/0235537 | A1* | 9/2012 | Masunaga | B81B 3/0072 310/300 |
| 2012/0261233 | A1* | 10/2012 | Huettner | B65G 47/28 198/459.1 |
| 2013/0126317 | A1* | 5/2013 | Goggin | H01H 57/00 200/181 |
| 2014/0076697 | A1* | 3/2014 | Gupta | B81B 3/0013 200/181 |
| 2014/0125204 | A1* | 5/2014 | Matsuda | H10N 30/8536 310/365 |
| 2014/0152134 | A1* | 6/2014 | Heo | H02K 21/00 74/DIG. 9 |
| 2014/0184024 | A1* | 7/2014 | Loverich | H02N 2/188 310/300 |
| 2014/0240810 | A1* | 8/2014 | Sapir | G02B 26/0833 359/224.1 |
| 2014/0265645 | A1* | 9/2014 | Jacobs | H02K 1/12 310/12.24 |
| 2015/0130956 | A1* | 5/2015 | Ohashi | H02N 2/0015 359/557 |
| 2015/0180375 | A1* | 6/2015 | Kleipa | H02N 2/18 310/339 |
| 2015/0283916 | A1* | 10/2015 | Coleman | B65G 54/02 104/281 |
| 2015/0355457 | A1* | 12/2015 | Matsumoto | B81C 1/00039 359/234 |
| 2016/0023244 | A1* | 1/2016 | Zhuang | B81B 3/0037 29/829 |
| 2016/0079886 | A1* | 3/2016 | Hasegawa | H02N 2/188 310/319 |
| 2016/0134256 | A1* | 5/2016 | Kare | H03H 9/145 333/101 |
| 2016/0218029 | A1 | 7/2016 | Janakiraman et al. | |
| 2016/0268084 | A1* | 9/2016 | Gudeman | H01H 49/00 |
| 2017/0098509 | A1* | 4/2017 | Gupta | H01G 5/40 |
| 2017/0225814 | A1* | 8/2017 | Eberhardt | B65B 7/2821 |
| 2017/0225911 | A1* | 8/2017 | Baechle | B65G 47/28 |
| 2018/0308735 | A1 | 10/2018 | Janakiraman et al. | |
| 2019/0097515 | A1* | 3/2019 | Ota | H02P 6/12 |
| 2019/0100389 | A1* | 4/2019 | Neubauer | H02K 7/08 |
| 2019/0131860 | A1* | 5/2019 | Suzuki | B23Q 7/14 |
| 2019/0140495 | A1* | 5/2019 | Gajanayake | F01D 15/10 |
| 2019/0152724 | A1* | 5/2019 | Philipp | B65G 43/00 |
| 2019/0348898 | A1 | 11/2019 | Frangen | |
| 2019/0367297 | A1* | 12/2019 | Hartung | B65G 54/02 |
| 2021/0221008 | A1* | 7/2021 | Lu | B65G 1/0435 |
| 2021/0234445 | A1* | 7/2021 | Loesch | B64D 27/02 |
| 2023/0097926 | A1* | 3/2023 | Hauer | B65G 54/02 198/619 |
| 2023/0115484 | A1* | 4/2023 | Volk | B65G 54/02 318/135 |
| 2023/0382662 | A1* | 11/2023 | Katsuura | C23C 14/50 |

FOREIGN PATENT DOCUMENTS

| | | |
|---|---|---|
| DE | 195 31 520 | 1/1997 |
| DE | 102014214107 | 2/2015 |
| DE | 10 2014 214 696 | 1/2016 |
| DE | 10 2016 205 513 | 10/2017 |
| DE | 10 2016 224 951 | 6/2018 |
| EP | 3 172 134 | 1/2016 |
| EP | 3 172 156 | 1/2016 |
| EP | 3379719 | 9/2018 |
| KR | 20190049532 | 5/2019 |
| WO | 01/59409 | 8/2001 |
| WO | 2016/012160 | 1/2016 |
| WO | 2016/012171 | 1/2016 |
| WO | 2016/118335 | 7/2016 |
| WO | 2018/176137 | 10/2018 |

OTHER PUBLICATIONS

Int'l Search Report (Form PCT/ISA/210) conducted in Int'l Appln. No. PCT/EP2020/064877 (dated Sep. 10, 2020).

Int'l Written Opinion (Form PCT/ISA/237) conducted in Int'l Appln. No. PCT/EP2020/064877 (dated Sep. 10, 2020).

* cited by examiner

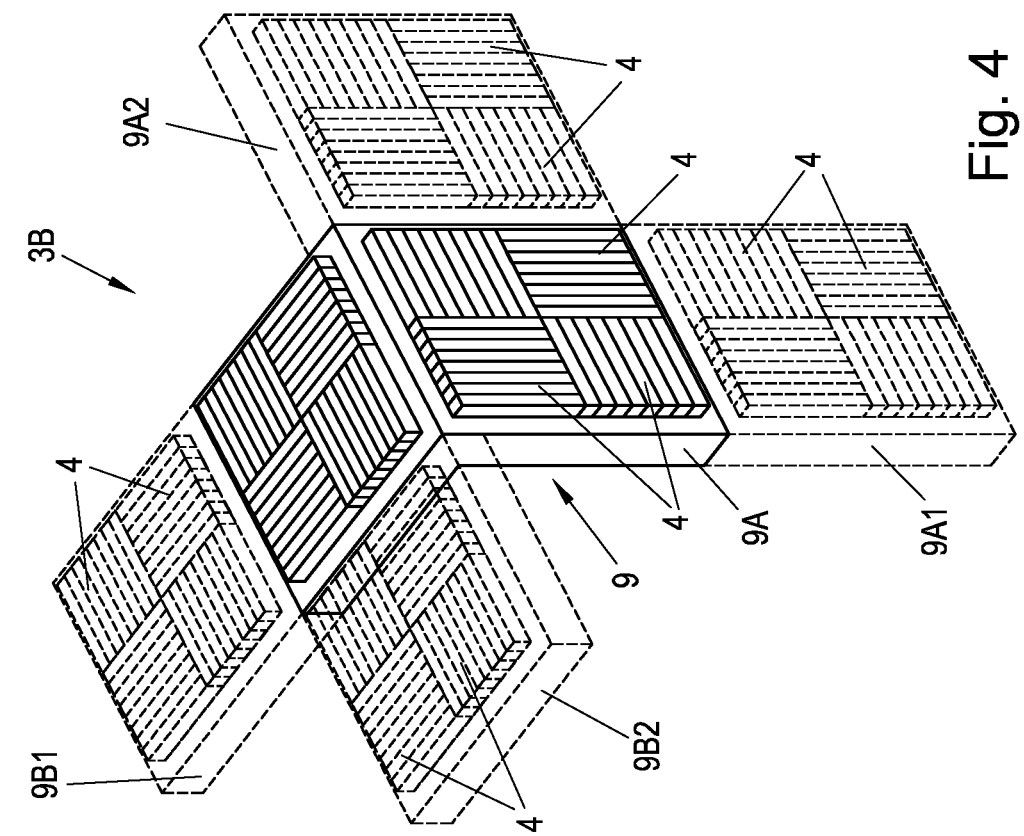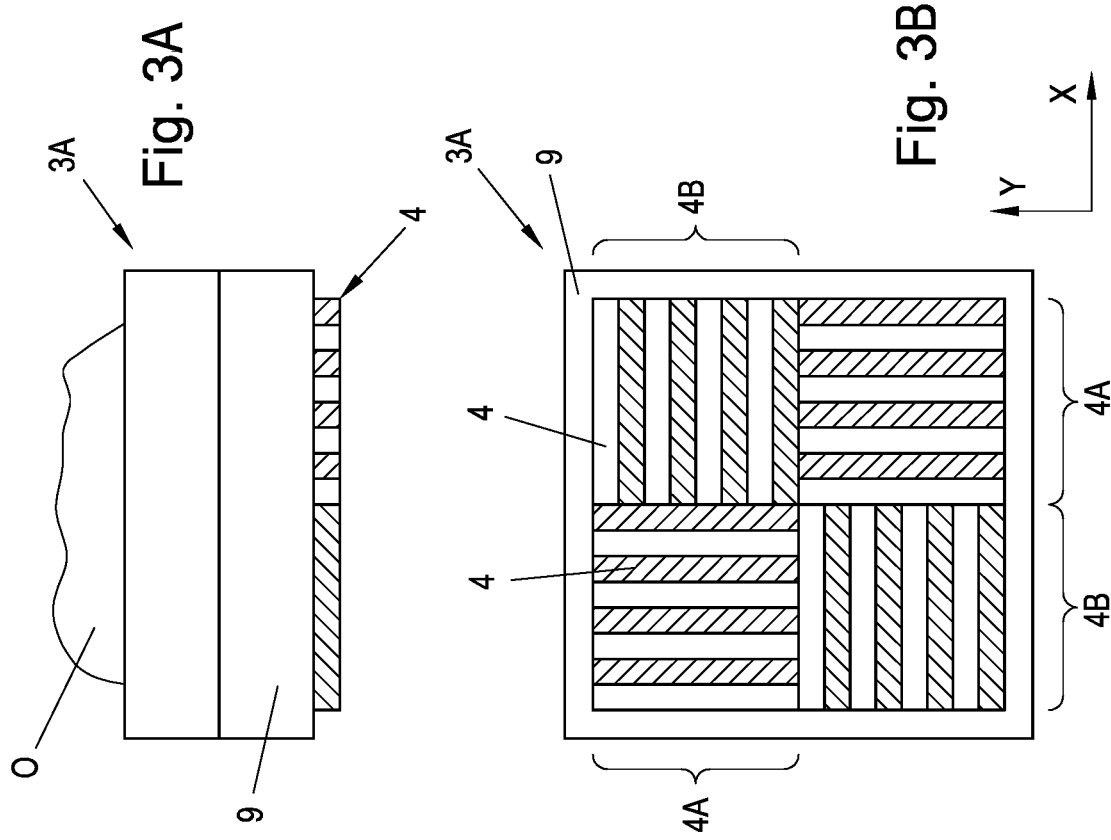

TRANSPORT DEVICE

The invention relates to a transport device comprising at least two planar motors, each of which forms a transport plane in which at least one transport unit can be moved two-dimensionally, wherein the transport planes of the at least two planar motors are adjacent to one another and are inclined with respect to one another at a contact angle, with drive coils being provided on each planar motor, for electromagnetic interaction with drive magnets of a transport unit in order to move the transport unit in the relevant transport plane. The invention further relates to a transport unit for a transport device with at least two planar motors with transport planes which are adjacent to one another and are inclined with respect to one another at a contact angle, as well as a method for operating a transport device.

Planar motors are well known in the prior art. For example, U.S. Pat. No. 9,202,719 B2 discloses the basic design and mode of operation of such a planar motor. A planar motor substantially has a transport plane along which one or more transport units can be moved two-dimensionally. Drive coils which are controlled by a control unit in order to generate a moving magnetic field in the desired direction of movement and are distributed on the transport plane are usually provided on the planar motor for this purpose. Drive magnets (permanent magnets or magnetic fields) are distributed two-dimensionally on the transport unit and interact with the magnetic field so that a driving force is exerted on the transport unit in the desired direction of movement. The drive coils and the drive magnets are advantageously arranged in such a way that, in addition to a one-dimensional movement along the axes spanned by the transport plane, more complex two-dimensional movements of the transport unit in the transport plane are also possible. A planar motor can be used, for example, as a transport device in a production process, very flexible transport processes with complex movement profiles being implementable.

In EP 3 172 156 B1 and EP 3 172 134 B1, for example, such applications of a planar motor as a transport device are shown. For example, two planar motors are arranged adjacent to one another and transport units can be moved on both planar motors. This enables transport units to move independently of one another in two planes. In another embodiment, a planar motor and one or more continuous conveyors interact in order to manipulate products in a certain way. The transport units of the planar motor can each be individually moved two-dimensionally in a vertical plane. The planar motor allows a very flexible movement in the vertical plane, but the flexibility is limited by the continuous conveyor.

WO 2018/176137 A1 discloses a transport device which can have two spaced parallel planar motor stators, each of which forms a transport plane in which a transport unit can be moved. The transport units can be articulated on a connecting body on which an object can be transported. By relative movement of the transport units, the object can be moved in the normal direction to the transport planes. DE 195 31 520 A1 discloses a similar transport device, wherein the transport units are movable in the same transport plane.

Further transport devices in the form of planar motors are disclosed in DE 10 2016 224 951 A, WO 01/59409 A2 and WO 2016/012171 A1.

It is therefore an object of the invention to provide a transport device with a plurality of planar motors which enables greater flexibility in the movement of the transport units.

According to the invention, at least one multiple-action transport unit is provided on the transport device, wherein on the multiple-action transport unit are at least first drive magnets for electromagnetic interaction with the drive coils of a first planar motor and at least second drive magnets for electromagnetic interaction with the drive coils of a second planar motor are provided, wherein the multiple-action transport unit can be moved two-dimensionally on the transport plane of one of the planar motors, or can be moved simultaneously, one-dimensionally on neighboring transport planes of the first and second planar motor. This enables very flexible and complex movement sequences, for example a multiple-action transport unit can be moved in a conventional manner in only one of the adjacent transport planes. A multiple-action transport unit can, however, be moved one-dimensionally in both adjacent transport planes at the same time, for example in order to be able to generate a greater driving force. Furthermore, it is particularly advantageous that the multiple-action transport unit can also be transferred from one transport plane to an adjacent transport plane.

As a multiple-action transport unit, a double-action transport unit is preferably provided, on which a base body with two legs is provided, these legs being arranged at an angle to one another that corresponds to the contact angle between two adjacent transport planes, wherein the first drive magnets are arranged on one leg and the second drive magnets are arranged on the other leg.

It is particularly advantageous if the multiple-action transport unit can be decoupled into at least two single-action transport units, wherein at least one coupling device is provided on each of the at least two single-action transport units in order to releasably couple the transport units to one another in order to form the multiple-action transport unit.

It is advantageous if the contact angle between the two adjacent transport planes is between 30° and 150°, preferably 90°.

At least one planar motor control unit is preferably provided per planar motor to control the drive coils of the relevant planar motor, wherein the planar motor control units of the at least two planar motors are connected to exchange control information for controlling transport units of the relevant planar motor and/or the planar motor control units are connected to a higher-level transport device control unit or integrated therein. As a result, the control commands can be exchanged and synchronized between individual planar motors in order to coordinate the movement profiles of the transport units with one another.

At least one planar motor is preferably constructed from a plurality of transport segments which are adjacent to one another and together form the transport plane of the planar motor, wherein drive coils are provided on each transport segment. A modular structure is thus possible, so that planar motors with transport planes of different sizes can be created with a standardized transport segment.

It is also advantageous if at least two planar motors with transport planes facing one another are provided in the transport device, wherein at least one transport unit is provided in the transport plane of one of the planar motors and is connected by means of a connecting unit to at least one transport unit provided in the transport plane of the at least one other planar motor. By connecting two or more transport units by means of a connecting unit, very complex movement patterns, for example of a point on the connecting unit, can be made possible by superimposing the movement profiles of the transport units. For example, a rigid or flexible element can be used as the connecting unit. However, an object to be moved, such as for example a flexible film or a textile material which is arranged between two or more transport units, can also be used directly as a connecting unit.

Preferably, an arrangement angle is provided between the facing transport planes which is a maximum of 45°, and the arrangement angle is preferably 0°, with the transport planes arranged opposite and parallel to one another. In this way, the transport planes which face one another can be positioned very variably in space relative to one another, so that the transport device can be designed very flexibly.

The connecting unit is preferably adjustable in order to adapt a connecting unit length during the movement of the at least two transport units to a variable distance between the at least two transport units. This creates a greater degree of freedom in the movement of the connected transport units.

The object is further achieved with a transport unit by a design of the transport unit as a multiple-action transport unit that can be moved two-dimensionally in the transport plane of one of the planar motors or can be moved one-dimensionally in the adjacent transport planes of the at least two planar motors at the same time, wherein at least drive magnets are provided on the transport unit to interact electromagnetically with the drive coils of a first planar motor, and at least second drive magnets are provided to interact electromagnetically with the drive coils of a second planar motor.

Furthermore, the object is achieved by means of a method for operating a transport device in that at least one multiple-action transport unit is provided on the transport device, wherein at least first drive magnets which interact electromagnetically with the drive coils of a first planar motor and at least second drive magnets which interact electromagnetically with the drive coils of a second planar motor are provided on the multiple-action transport unit, wherein the transport unit is moved two-dimensionally in the transport plane of one of the planar motors or is moved one-dimensionally in the adjacent transport planes of the at least two planar motors at the same time, by controlling the drive coils of at least one of the planar motors by the corresponding planar motor control unit in order to interact with the first or second drive magnet of the multi-acting transport unit power to work together.

Figure 1B:
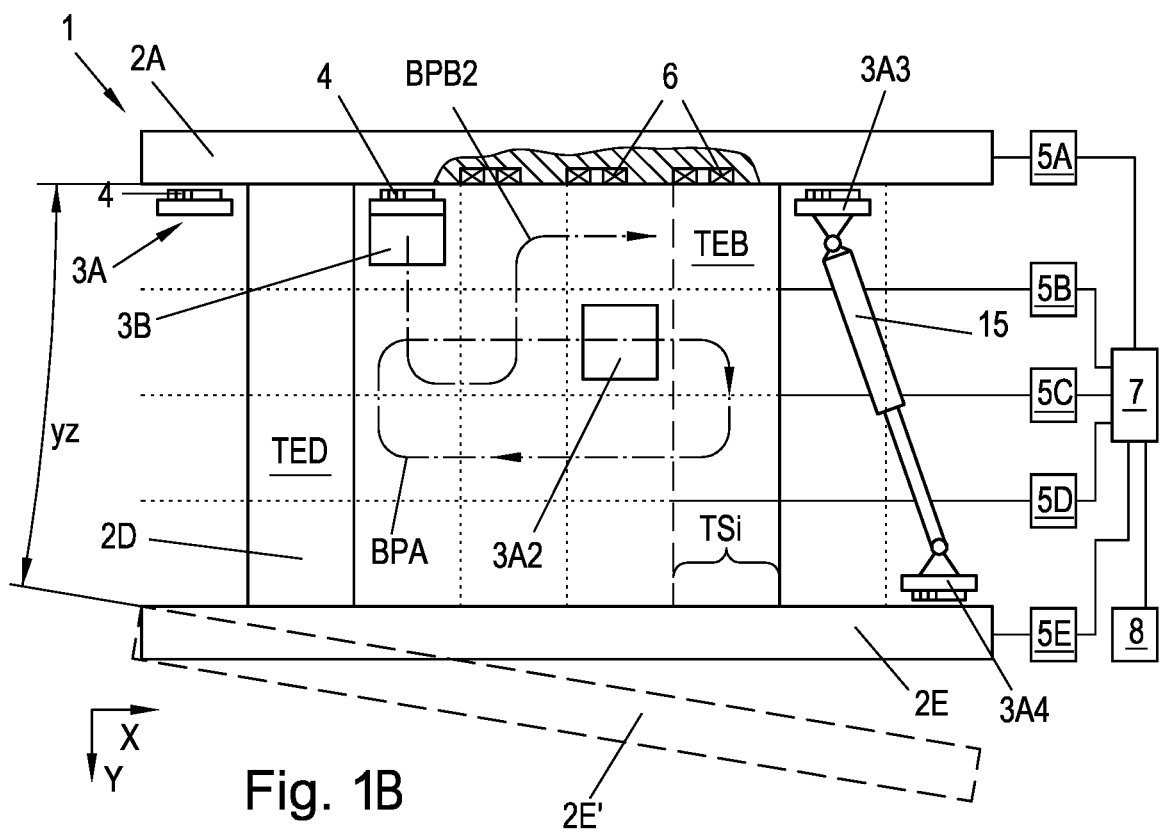
Figure 1C:
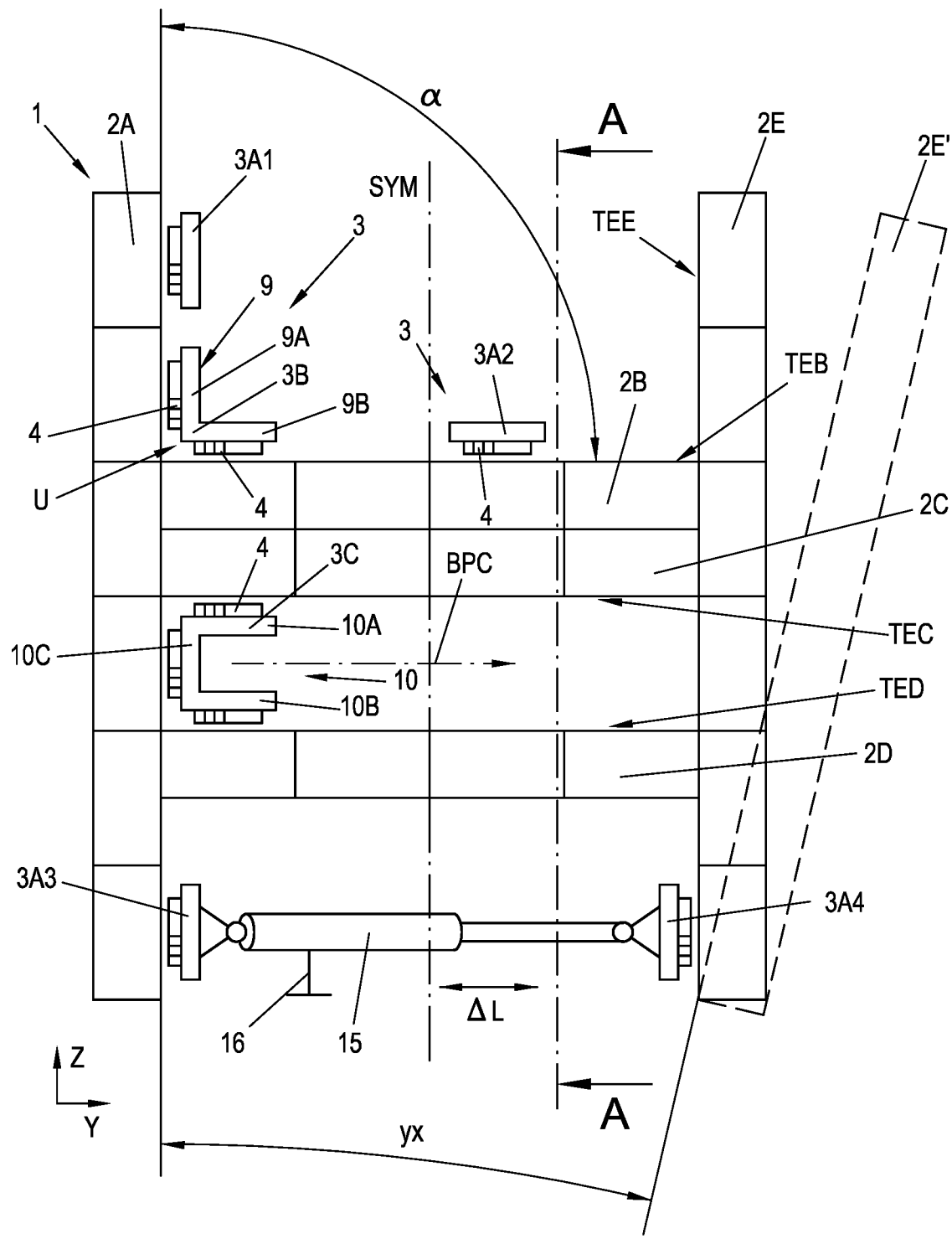
Figure 2:
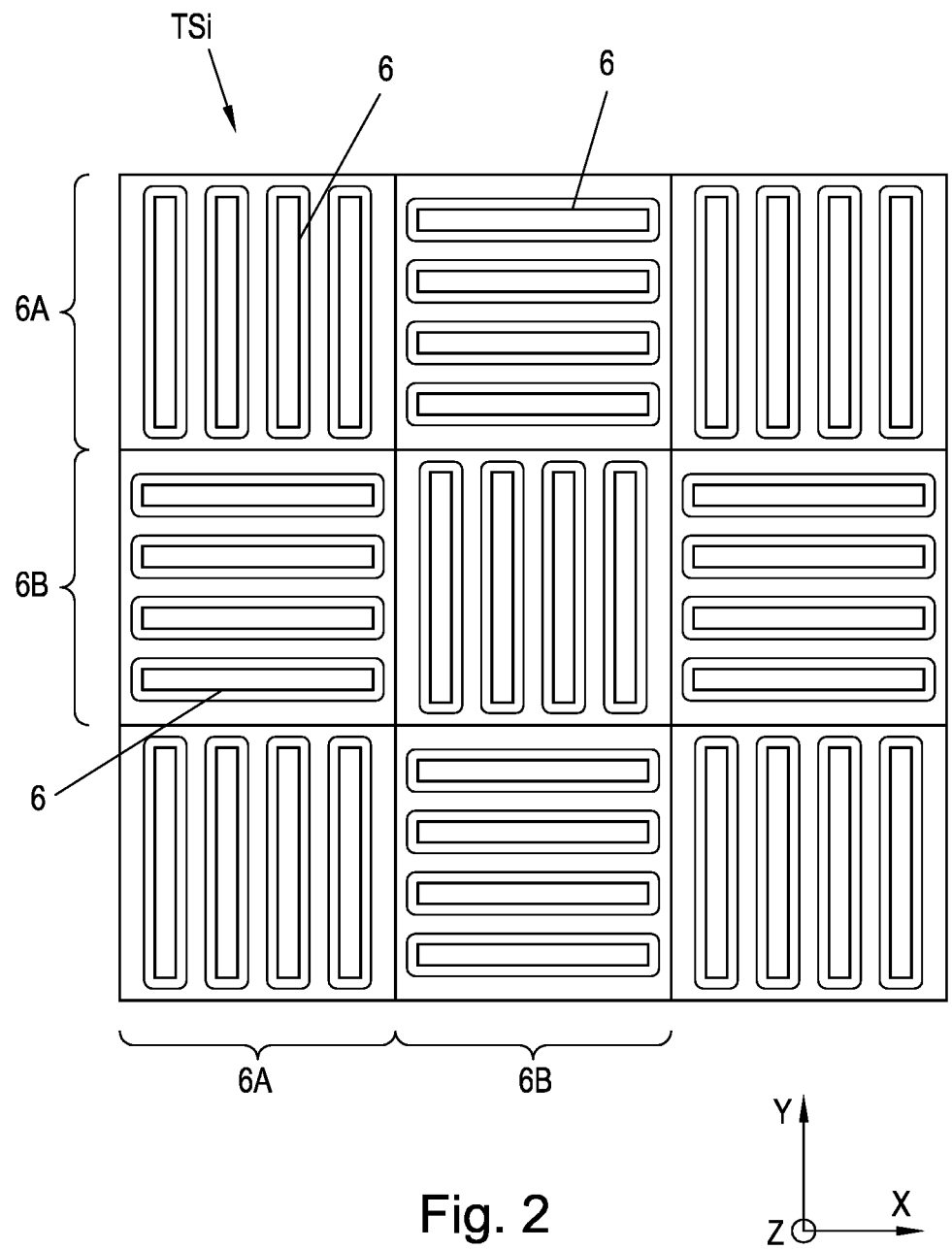
Figure 5:
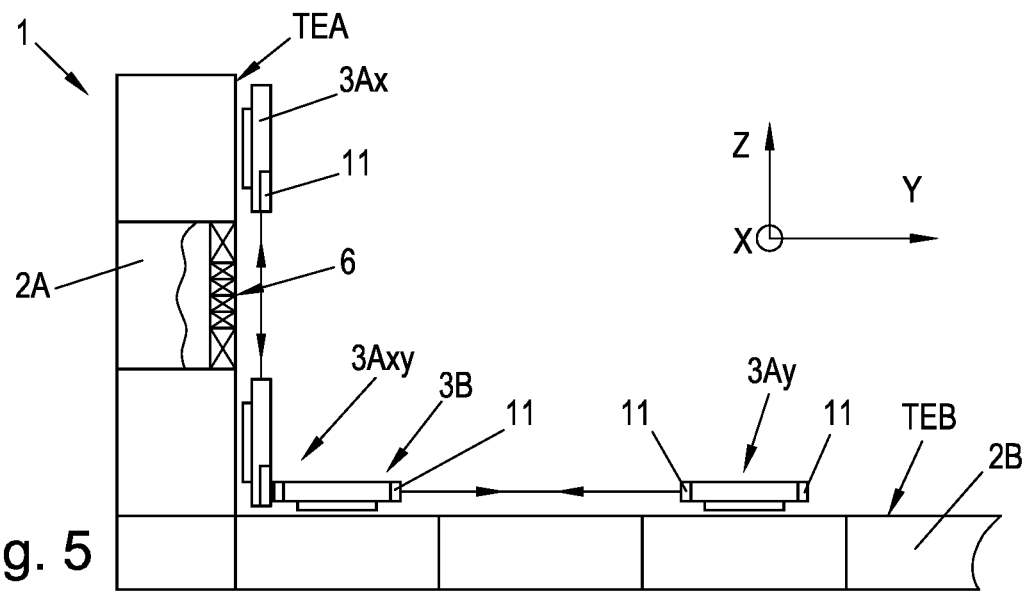
Figure 6:
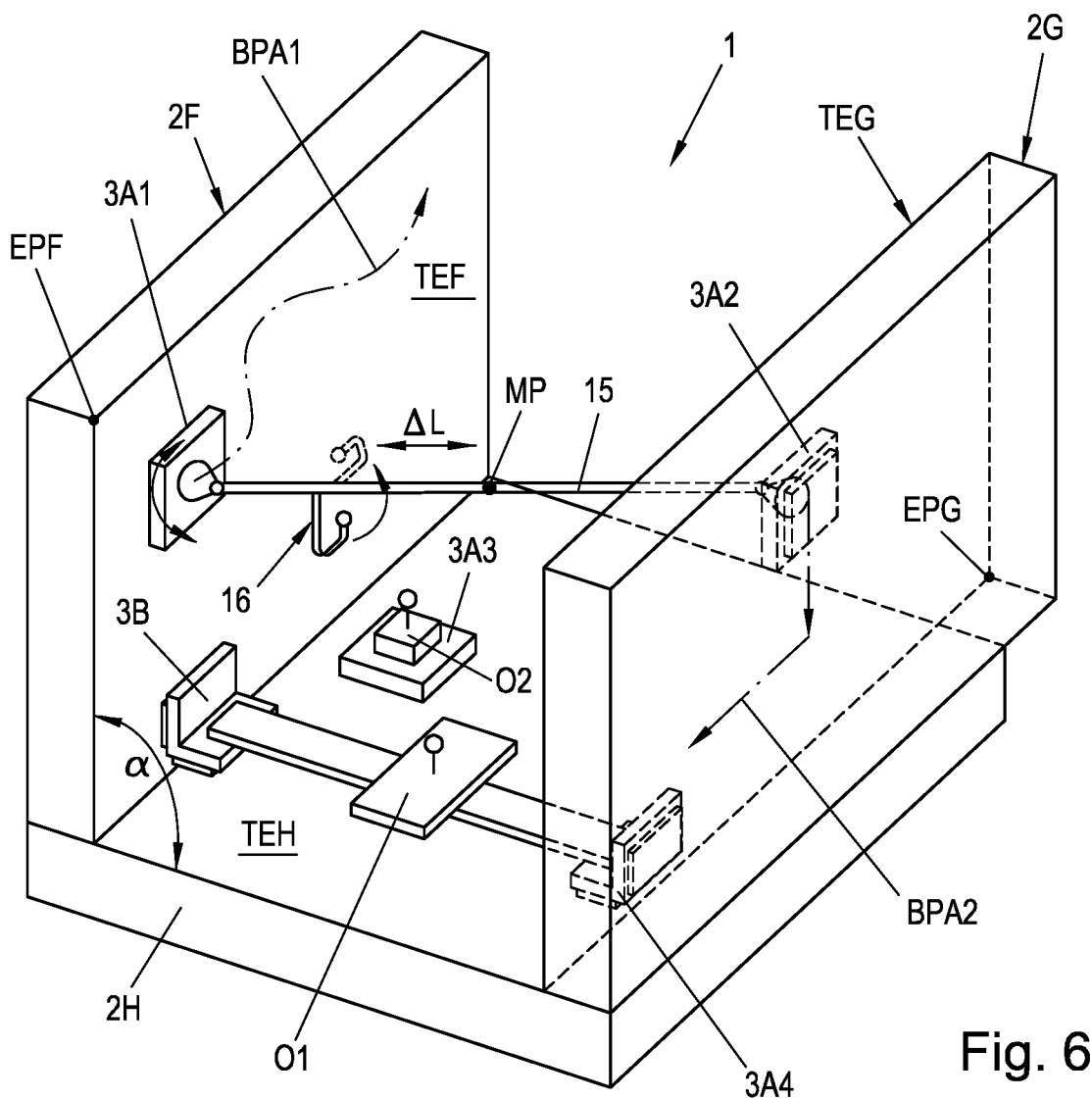

In the following, the present invention is described in greater detail with reference to FIGS. 1 to 6, which show, by way of example, schematic and non-limiting advantageous embodiments of the invention. In the drawings:

FIG. 1A-1C show an example of a transport device according to the invention in a front view, a top view and in a side view, FIG. 2 shows an arrangement of drive coils on a transport segment of a planar motor, FIG. 3A shows a single-action transport unit of a planar motor in a side view, FIG. 3B shows an arrangement of drive magnets on a single-action transport unit, FIG. 4 shows a double-action transport unit of a planar motor in an isometric view, FIG. 5 shows a process for coupling transport units in a side view of a transport device, FIG. 6 shows a further example of a transport device according to the invention with two transport units connected by means of a connecting unit.

In FIG. 1A an embodiment of a transport device 1 according to the invention is shown by way of example in a sectional view along the section line A-A in FIG. 1C. A first planar motor 2A which forms a first transport plane TEA is provided in the transport device 1. In the example shown, the first transport plane TEA is a vertical plane with a vertical axis Z and a longitudinal axis X. The first planar motor 2A is made up of a plurality i of transport segments TSi that are adjacent to one another in order to form the first transport plane TEA. As a result, a planar motor 2 can be constructed in a modular manner and transport planes TEi with areas of different sizes can be implemented. Of course, this modular structure is only optional and a planar motor 2 could also be made up of only one single assembly or one single transport segment TSi.

In the first transport plane TEA of the first planar motor 2A, transport units 3 can be moved two-dimensionally. For example, a movement would only be possible in one axial direction along the vertical axis Z or the longitudinal axis X or a two-dimensional movement profile with a Z coordinate and an X coordinate in the first transport plane TEA, as indicated by the movement profile BPA of the transport unit 3A. For this purpose, drive coils 6 which are controlled by a control unit 5A are provided on the first planar motor 2A. An electrical voltage can be applied to the drive coils 6 in order to generate a magnetic field. A substantially moving magnetic field can be generated by appropriate control of drive coils 6 that are arranged next to one another. The drive coils 6 are advantageously arranged on the first planar motor 2A in such a way that the magnetic field can extend in any directions in the first transport plane TEA in order to realize corresponding movement profiles of the transport units 3. The transport plane TEi is not to be understood here as a plane in the mathematical sense, but rather a flat transport surface which is delimited by the relevant planar motor 2 and on which the transport units 3 can move.

Drive magnets 4, for example permanent magnets, are arranged on each of the transport units 3 and interact with the drive coils 6 in order to exert a driving force on the transport unit 3. Depending on the activation of the drive coils 6, a moving magnetic field is thus generated which interacts with the drive magnets 4 in order to move the transport unit 3. During operation, between the drive coils 6 and the drive magnets 4, an air gap is provided between the transport units 3 and the relevant planar motor 2. In addition to the two-dimensional movement in the transport plane TEA (or generally TEi), a certain movement of the transport units 3 in the vertical direction, that is to say normal to the transport plane TEi, is also possible. By appropriate control of the drive magnets 6, the air gap can be increased and decreased to a limited extent, as a result of which the transport unit 3 can be moved in the vertical direction.

The extent of the available freedom of movement in the vertical direction depends substantially on the structural design of the transport device 1, in particular on the maximum magnetic field that can be generated by the drive coils 6 and the drive magnets 4, as well as the mass and load of the transport unit (e.g. the weight of a transported object). Depending on the size and design of the transport device 1, the available range of movement in the vertical direction can be, for example, in the range from a few mm to several centimeters.

The transport units 3 can be held in any way on the planar motor 2 or on the transport plane TE, for example in order to maintain the air gap. Any suitable guide elements can be provided on the transport units 3 for this purpose.

The structure and mode of operation of a planar motor are, however, known in principle, which is why no detailed description is given at this point. It is generally known that a planar motor 2 always has a stator as a fixed component and has at least one transport unit 3 as a movable component.

As is known, the stator forms the transport plane TE in which the at least one transport unit 3 can be moved by electromagnetic interaction of the drive coils 6 and the drive magnets 4. The drive coils 6 are usually arranged on the stator and the drive magnets 4 are usually arranged on the transport unit 3. Of course, as is known, the reverse variant is also conceivable, with the drive coils 6 on the transport unit 3 and the drive magnets 4 on the stator. An arrangement of drive coils 6 on a transport segment TSi is shown by way of example in FIG. 2 and will be described in detail below. An arrangement of drive magnets 4 on a transport unit 3 is shown by way of example in FIG. 3A+3B and FIG. 4.

Furthermore, at least one second planar motor 2 which forms a second transport plane TEB is provided in the transport device 1, wherein the transport planes TEA, TEB of the planar motors 2A, 2B are adjacent to one another and are inclined with respect to one another at a certain contact angle α. Of course, however, the at least two planar motors 2A, 2B do not have to be designed as structurally separate units, but could, for example, also be implemented in the form of an integral unit on which the transport planes TEA, TEB are provided. In the example shown, the two transport planes TEA, TEB are normal to one another, and the contact angle α is thus 90 degrees. Of course, another angle would also be conceivable. The contact angle α is preferably between 30° and 150°, particularly preferably 90°. In general, the contact angle α between two adjacent transport planes TEi is to be understood as the angle between the normal vectors of the adjacent transport planes TEi (here TEA, TEB). Drive coils 6 (not shown) are provided on the second planar motor 2B in a manner analogous to the first planar motor 2A, and are controlled by a planar motor control unit 5B in order to interact electromagnetically with drive magnets 4 of the transport units 3 in order to move the transport units 3 two-dimensionally in the second transport plane TEB.

Of course, further planar motors 2 can also be provided, in this case for example a third planar motor 2C, a fourth planar motor 2D and a fifth planar motor 2E. The transport planes TEC, TED of the third and fourth planar motors 2C, 2D are likewise directly adjacent to the transport plane TEA of the first planar motor 2A and are normal thereto. The third planar motor 2C here is also directly adjacent to the second planar motor 2B, so that parallel transport planes TEB, TEC that face away from one another result. The planar motors 2B, 2C, 2D are substantially identical here, with the same dimensions in the vertical, longitudinal and transverse directions Z, X, Y. However, the fourth planar motor 2D is arranged offset in the longitudinal direction X with respect to the second and third planar motor 2B, 2C. Of course, this is only an example and any other configurations would also be possible.

The fifth planar motor 2E is arranged such that its transport plane TEE faces the transport plane TEA of the first planar motor 2A, wherein the transport planes TED, TEA are parallel to one another here. This results in a substantially symmetrical transport device 1 with a plane of symmetry SYM (FIG. 1B). Like the first planar motor 2A, the other planar motors 2B, 2C, 2D, 2E are also constructed from a plurality of transport segments TSi which are adjacent to one another, on each of which drive coils 6 are provided. As a result of the modular structure, a transport device 1 with a plurality of planar motors 2, also with transport planes of different sizes in each case, can be implemented, for example, with just one type of transport segment TSi.

In the example shown, a planar motor control unit 5A-5E is provided for each planar motor 2A-2E, with which the drive coils 6 of the relevant planar motor 2A-2E can be controlled, as shown in FIG. 1B. The planar motor control units 5A-5E here are connected to a higher-level transport device control unit 7. Of course, the planar motor control units 5A-5E could also be integrated into the higher-level transport device control unit 7. It can also be provided that a segment control unit is provided for each transport segment TSi, or a group of transport segments TSi, and can also be integrated in a planar motor control unit 5A-5E. The transport device control unit 7 is here connected to a user interface 8, for example a computer, via which the transport unit 1 can be controlled. The movement profiles of transport units 3 which are moved on different planar motors 2A-2E can be synchronized or coordinated with one another via the transport device control unit 7, for example to avoid a collision of transport units 3 or objects transported with them. A control program that realizes the desired movement profiles of the transport units 3 runs on each of the planar motor control units 5A-5E.

Various transport units 3 can be moved simultaneously and independently of one another on the transport device 1. In the example shown, a single-action transport unit 3A1, 3A2 is provided on each of the first and second planar motors 2A, 2B. The single-action transport units 3A1, 3A2 can thus be moved in substantially any two-dimensional manner in the relevant transport plane TEA, TEB. The single-action transport unit 3A1 shown on the first planar motor 2A can, for example, be moved in the first transport plane TEA according to the movement profile BPA with a coordinate in the vertical direction Z and a coordinate in the longitudinal direction X, as indicated in FIG. 1A. The single-action transport unit 3A1 shown on the second planar motor 2A can be moved, for example, in the second transport plane TEB according to the movement profile BPA shown in FIG. 1B with a coordinate in the transverse direction Y and a coordinate in the longitudinal direction X.

A single-action transport unit 3A has drive magnets 4 only on one side, as shown by way of example in FIG. 4a+4b. A single-action transport unit 3A can therefore only be moved in one transport plane TEi, wherein the drive magnets 4 of the single-action transport unit 3A interact with the drive coils 6 of the corresponding planar motor 2. A movement of a single-action transport unit 3A, for example from the first transport plane TEA to the second transport plane TEB, is not possible. However, a single-action transport unit 3A could of course be picked up manually, for example by a user or a manipulation device (e.g. crane or robot) from the transport plane TEi of a planar motor 2 and placed on the transport plane TEi of another planar motor 2 and moved further thereon.

According to the invention, at least one multi-action transport unit 3B, 3C is provided in the transport device 1, which can either be moved two-dimensionally in the transport plane TEi of a planar motor 2 or at the same time can be moved one-dimensionally in the adjacent transport planes TEi of at least two planar motors 2. At least first drive magnets 4 which are provided to interact electromagnetically with the drive coils 6 of a planar motor 2, and at least second drive magnets 4 which are provided to interact electromagnetically with the drive coils 6 of a planar motor 2 with an adjacent transport plane TEi, are arranged on the multiple-action transport unit 3B, 3C.

In the example shown, a double-action transport unit 3B is provided, which has a substantially L-shaped base body 9. First drive magnets 4 which interact with the drive coils 6 of the first planar motor 2A are provided on one leg 9A of the L-shaped base body 9 of the transport unit 3B. Second drive magnets 4 which interact with the drive coils 6 of the second planar motor 2B are provided on the second leg 9B of the L-shaped base body. The angle between the legs 9A, 9B of the L-shaped base body 9 substantially corresponds to the contact angle α between the first and second transport plane TEA, TEB, here for example 90 degrees.

In the example shown, the double-action transport unit 3B can now, for example, only be moved two-dimensionally in the first transport plane TEA of the first planar motor 2A. For this purpose, the drive coils 6 of the first planar motor 2A are controlled accordingly by the planar motor control unit 5A (or the transport device control unit 7) in order to interact with the first drive magnets 4 on the first leg 9A of the double-action transport unit 3B in order to generate a driving force. The double-action transport unit 3B could thus be moved, for example, according to the movement profile BPB1 with the coordinates Z, X in the first transport plane TEA. However, the double-action transport unit 3B could, for example, also be moved only in the second transport plane TEB of the second planar motor 2B. For this purpose, the drive coils 6 of the second planar motor 2B are controlled accordingly by the planar motor control unit 5B (or the transport device control unit 7) in order to interact with the second drive magnets 4 on the second leg 9B of the double-action transport unit 3B in order to generate a driving force. The double-action transport unit 3B could thus be moved, for example, according to the movement profile BPB2 with the coordinates X, Y in the second transport plane TEB.

In a particularly advantageous manner, however, the double-action transport unit 3B can also be moved one-dimensionally on the first transport plane TEA of the first planar motor 2A and the second transport plane TEB of the second planar motor 2B at the same time. For this purpose, the drive coils 6 of the first planar motor 2A and/or the drive coils 6 of the second planar motor 6 are controlled accordingly by the planar motor control unit 5A and/or the planar motor control unit 5B (or the transport device control unit 7) in order to interact with the first drive magnets 4 on the first leg 9A and/or with the drive magnets 4 on the second leg 9B of the double-action transport unit 3B in order to generate a driving force. The double-action transport unit 3B could thus be moved, for example, with the X coordinate according to the movement profile BPB3. This corresponds substantially to a one-dimensional movement in the direction of the line of intersection of the two adjacent transport planes TEA, TEB. For example, when heavy objects are being transported, it can be advantageous if the drive coils 6 of both planar motors 2A, 2B are energized in order to generate a higher driving force on the double-action transport unit 3B.

Advantageously, the region of the adjacent transport planes TEA, TEB can also be used as a transfer point U (see FIG. 10) to move a double-action (or multiple-action) transport unit 3B, for example, from the transport plane TEA to the adjacent transport plane TEB. This enables relatively complex movement patterns to be implemented. For example, the double-action transport unit 3B could first be moved in the second transport plane TEB of the second planar motor 2B in the transverse direction Y to the transfer point U (from right to left in FIG. 1C), wherein the movement is controlled via the drive coils 6 of the second planar motor 2B. In the transfer point U, the double-action transport unit 3B is advantageously stopped briefly, and the double-action transport unit 3B can be moved from the transfer point U in the transport plane TEA of the first planar motor 2A, wherein the movement is controlled via the drive coils 6 of the first planar motor 2B. From the transport plane TEA of the first planar motor 2A, the double-action transport unit 3B could in turn be transferred to the transport plane TED of the fourth planar motor 2D, etc.

In principle, however, a transfer would also be possible without changing the direction of the double-action transport unit 3B. For example, the double-action transport unit 3B could be moved in the longitudinal direction X according to the movement profile BPB3, wherein the drive can take place via the drive coils 6 of the second planar motor 2B and/or via the drive coils 6 of the first planar motor 2A. At the end of the second planar motor 2B in the longitudinal direction X, the first planar motor 2A could take over the driving and the double-action transport unit 3B could be moved further in the longitudinal direction X and/or in the vertical direction Z by the drive coils 6 of the first planar motor 2A. In this case there would be no need to stop the transfer.

In the example shown, a triple-action transport unit 3C is also shown. The triple-action transport unit 3C has a substantially U-shaped base body 10 with three legs 10A, 10B, 10C, on each of which drive magnets 4 are provided. With a correspondingly configured transport device 1 as in FIG. 1A-1C, simultaneous driving by means of three planar motors 2A, 2C, 2D (or 2E, 2C, 2D, for example) would be possible. Of course, the triple-action transport unit 3C could also only be moved in a single transport plane TEA-TEE.

Of course, a transport unit 3 with 4-way, 6-way or generally x-way action (not shown), and with drive magnets 4 on 4, 6, . . . x sides, would also be conceivable. The transport unit 3 with x-way action could thus be moved one-dimensionally in x transport planes TEi at the same time or two-dimensionally in each of the x transport planes TEi. The number of sides on which drive magnets 4 are provided is advantageously coordinated with the available planar motors 2 and the transport planes TEi thereof which are arranged relative to one another.

According to a further advantageous embodiment of the invention, at least two planar motors 2 with transport planes TEi facing one another are provided in the transport device 1, wherein at least one transport unit 3 is provided in the transport plane TEi of one of the planar motors 2, which is connected by means of a connecting unit 15 to at least one transport unit 3 provided in the transport plane TEi of the at least one other planar motor 2. Advantageously, the transport planes TEi which face one another are also arranged spaced apart from one another, and thus they preferably are not adjacent to one another or do not intersect.

Preferably, an arrangement angle γ which is a maximum of 45° is provided between the transport planes TEi which face one another, wherein it is particularly advantageous if the arrangement angle γ=0°, with the transport planes TEi which face one another being arranged opposite and parallel to one another. In general, the arrangement angle γ is to be understood as the angle between the normal vectors of the relevant transport planes TEi which face one another. In the example shown, two single-action transport units 3A3, 3A4 are provided in the transport device 1, wherein the single-action transport unit 3A3 is movable in the transport plane TEA of the first planar motor 2A and the transport unit 3A4 is movable in the transport plane TEE of the fifth planar motor 2E. The transport planes TEE of the fifth planar motor 2E and the transport plane TEA of the first planar motor 2A are arranged in parallel here and face one another, and the arrangement angle γ is thus 0°. Of course, the transport planes TEA, TEE could also be inclined towards one another.

However, the planar motors 2A, 2E could also be arranged, for example, in such a way that the transport planes TEA, TEE which face one another are inclined with respect to one another at an arrangement angle γ of a maximum of 45°, as indicated by dashed lines in FIGS. 1B and 1C. The fifth planar motor 2E could, for example, be arranged relative to the first planar motor 2A such that the transport plane TEE of the fifth planar motor 2E' is inclined at an arrangement angle $\gamma_Z$ about the Z axis relative to the transport plane TEA of the first planar motor 2A (FIG. 1B) and/or at an arrangement angle $\gamma_X$ about which the X axis is inclined relative to the transport plane TEA of the first planar motor 2A (FIG. 1C). A rotation relative to one another about the Y-axis is not limited, since the arrangement angle γ between the transport planes TEA, TEE does not change as a result.

The connecting unit 15 is designed here as a substantially rigid connecting rod which is connected in an articulated manner to both transport units 3A3, 3A4. The connecting unit 15 is preferably also designed to be adjustable in order to adapt a connecting unit length during the movement of the transport units 3A3, 3A4 to a variable distance between the at least two transport units 3A3, 3A4, as indicated in FIG. 1C by the length difference ΔL. A receiving unit 16 can also be provided on the connecting unit 15, for example, in order to receive and transport an object (not shown). The receiving unit 16 is only indicated in FIG. 1C; the specific design naturally depends on the use of the transport device 1 and is at the discretion of the person skilled in the art. The function of the connecting unit 15 is explained in greater detail below using the example in FIG. 6.

Of course, a rigid or flexible product that is connected to two or more transport units 3 could also be provided directly as the connecting unit 15. In this way, for example, flexible plastic film or textiles could be transported and/or, for example, stretched or expanded by transport units 3. It would also be conceivable, for example, that ropes, cables, wires, etc. are provided as the connecting unit 15 and that these are twisted, for example, by the relative movement of the transport units 3.

Furthermore, it would be conceivable for a separate planar motor 2 to be provided as the connecting unit 15 between at least two transport units 3. The planar motor 2 could then be moved by the transport units 3 and, in turn, a transport unit 3 could be moved two-dimensionally on the transport plane TEi of the planar motor 2. Instead of a planar motor 2, however, a known long stator linear motor could also be provided as the connecting unit 15. On a stator of the long stator linear motor, a plurality of drive coils are generally arranged one behind the other in a direction of movement and can be energized in order to generate a moving magnetic field. A transport unit, on which several drive magnets are arranged one behind the other, can be moved one-dimensionally along the stator in the direction of movement as a function of the magnetic field generated by the drive coils. A continuous conveyor, such as a belt conveyor or a chain conveyor, could also be provided as the connecting unit 15. It can be seen from this that a connecting unit 15 could be used in the most varied designs, as a result of which a large number of different movement sequences are possible.

An example of an arrangement of drive coils 6 on a transport segment TSi is shown in FIG. 2. The transport segment TSi is arranged on the planar motor 2 in such a way that the drive coils 6 face the drive magnets 4 of the transport units 3 during operation in order to form a transport plane TEi. The transport segment TSi here has a substantially square base area, but any other shapes are of course also possible. In order to enable a two-dimensional movement of the transport units 3, the drive coils 6 are divided into coil groups 6a, 6b. The coil groups 6A, 6B each have a certain number of drive coils 6, wherein the alignment of the drive coils 6 of the coil groups 6A, 6B differs. In the example shown, four drive coils 6 are provided for each coil group 6A, 6B and the drive coils 6 of the coil groups 6A, 6B are rotated by 90 degrees with respect to one another.

Of course, other arrangements, groupings and proportions would also be possible. For example, several layers of drive coils 6 could also be provided, which are arranged one above the other. For example, in the example shown, a further layer of drive coils 6 could be provided, for example under (or above) the illustrated drive coils 6 in the Z direction. The coil groups 6A, 6B could advantageously alternate in the Z direction. As a result, a substantially continuous moving magnetic field could be generated in the directions of the Y and X axes. The arrangement also allows a two-dimensional movement profile of the transport units 3 in the transport plane TEi, in this case with coordinates in the X and Y directions. A rotation of transport units 3 about an axis normal to the transport plane TEi is also possible (in this case about the Z-axis).

The drive coils 6 are preferably designed as so-called air coils without an iron core in order to reduce the permanent magnetic force of attraction between the transport units 3 and the transport segments TSi. As a result, the transport units 3 are less strongly attracted by the drive magnets 4 in the direction of the transport plane TEi, which is particularly advantageous in the case of multiple-action transport units 3B, 3C in order to facilitate a transfer from one transport plane TEi to an adjacent transport plane TEi.

In FIG. 3A, a single-action transport unit 3A is shown in a side view, while FIG. 3B shows the single-action transport unit 3A in a top view of the drive magnets 4 from below. The single-action transport unit 3A has a base body 9 with a substantially rectangular base area. On the underside, which faces the transport plane TEi of a planar motor 2 during operation, drive magnets 4 are arranged in a known manner. For example, an object O to be transported can be arranged on the opposing upper side of the base body 9. Similar to the drive coils 6 on the transport segment TSi, the drive magnets 4 are also divided into magnet groups 4A, 4B. A certain number of drive magnets 4 is provided in each magnet group 4A, 4B, wherein drive magnets 4 of different magnetic polarity alternate, as indicated in FIG. 4b by the hatched and non-hatched drive magnets 4. The drive magnets 4 of a magnet group 4A are oriented differently from the drive magnets 4 of the other magnet groups 4B.

In the example shown, the drive magnets 4 are at an angle of 90 degrees to one another. The magnet groups 4B are provided here for a movement of the transport unit 3A in the Y direction, and the magnet groups 4A are provided for a movement of the transport unit 3A in the X direction. Here, too, an arrangement of several layers of magnet groups 4A, 4B would be conceivable, analogously to the previously described coil groups 6A, 6B of the drive coils 6. As a result, a higher driving force can be generated and a more uniform movement and a more precise positioning of the transport unit 3A can take place. Of course, the single-action transport unit 3A shown is only to be understood as an example, and other shapes and other arrangements of drive magnets 4 would also be conceivable. For example, a single-action transport unit 3A with a base body 9 with a round base could be provided. The drive magnets 4 could then be arranged in a ring, wherein magnet groups 4A, 4B alternate in the circumferential direction.

In FIG. 4, a double-action transport unit 3B is shown which has already been described with reference to FIG. 1A-c. The double-action transport unit 3B has an L-shaped base body 9, with drive magnets 4 provided on each of the legs 9A, 9B. Of course, the angle between the legs 9A, 9B preferably corresponds to the contact angle α between two adjacent transport planes TEi on which the double-action transport unit 3B is to be moved. The arrangement of the drive magnets 4 on the relevant legs 9A, 9B substantially corresponds to the arrangement of the single-action transport unit 3A from FIG. 3A+3B. Again, a different shape of the base body 9 and/or a different arrangement of the drive magnets 4 could, of course, also be provided here. Since the function of a planar motor 2 is basically known in the prior art, it will not be discussed in more detail at this point.

However, a double-action transport unit 3B does not necessarily have to have identically configured legs 9A, 9B. It would be conceivable, for example, that one of the legs 9A, 9B is longer than the relevant second leg 9A, 9B, as indicated in FIG. 4 by dashed lines. A larger number of drive magnets 4, for example twice as many, could then be provided on the extended leg 9A1, 9B1 than on the relevant other leg 9A, 9B, as a result of which, for example, a greater driving force potential is achieved. Of course, both legs 9A, 9B could also be made longer (9A1, 9B1) in order to increase the number of drive magnets 4 in each case. However, oneleg, in this case the first leg 9A, could for example also be lengthened laterally, as is indicated by the dashed leg part 9A2 in FIG. 4. Likewise, the leg 9B could be expanded analogously on the same side or, for example, additionally or alternatively on the opposite side, as is indicated by the leg part 9B2. The legs could, however, also differ in terms of the number and/or size of the drive magnets 4. It can be seen from this that there are many possible ways in which a multiple-action transport unit can be designed. The specific structural design is, of course, at the discretion of the person skilled in the art, and is advantageously adapted to a particular planned application.

Another advantageous embodiment of the invention is shown in FIG. 5. The transport device 1 in FIG. 5 substantially corresponds to that in FIG. 1C, wherein only the relevant upper left region from FIG. 1C is shown. A double-action transport unit 3B is arranged in the region of the adjacent transport planes TEA, TEB. The double-action transport unit 3B differs from that in FIG. 1A-1C in that the double-action transport unit 3B can be decoupled into at least two single-action transport units 3Ax, 3Ay. For this purpose, at least one coupling device 11 is provided on each of the at least two single-action transport units 3Ax, 3Ay in order to releasably couple the transport units 3Ax, 3Ay to one another in order to form the multiple-action transport unit 3B.

After decoupling, the single-action transport unit 3Ax can be moved two-dimensionally in the conventional manner in the transport plane TEA of the first planar motor 2A. The other single-action transport unit 3Ay can be moved analogously in the transport plane TEB of the second planar motor 2B. The drive and the movement control take place via the drive coils 6 of the relevant planar motor 2A, 2B. The coupling devices 11 are only indicated schematically here. The coupling devices 11 are preferably standardized and identical on each transport unit 3Ax, 3Ay, in order to be able to couple any transport units 3A to one another to form a multiple-action transport unit. The coupling/decoupling can take place through the movement itself or can also take place actively, for example through corresponding actuators on the coupling devices 11. The structural design can be substantially of any desired type, for example a mechanical coupling device 11, for example with a positive or non-positive fit, or a magnetic coupling device 11 would be conceivable.

The transport units 3Ax, 3Ay can, of course, also be coupled again to form a double-action transport unit 3B. For this purpose, the transport units 3Ax, 3Ay are moved towards one another, for example on the relevant transport plane TEA, TEB, so that they meet in the area where the two transport planes TEA, TEB are adjacent to one another, as symbolized by the arrows. The coupling is preferably carried out automatically, for example when the two transport units 3Ax, 3Ay come into contact. After the coupling, the two transport units 3Ax, 3Ay can be moved together, substantially creating a transport unit assembly 3Axy, which corresponds to a double-action transport unit 3B. The possibilities for moving the coupled transport unit assembly 3Axy substantially correspond to those of the double-action transport unit 3B described above with reference to FIG. 1A-c. If coupling is no longer desired or required, the coupled transport unit assembly 3Axy can be released again and each transport unit 3Ax, 3Ay can again be moved individually on the corresponding transport plane TEA, TEB.

The coupling of two transport units 3Ax, 3Ay can be advantageous compared to the previously shown double-action transport unit 3B. On the one hand, the higher driving force potential of the double drive (through the drive coils 6 of the first and second planar motors 2A, 2B) can be used when the transport unit assembly 3Axy is moved in the longitudinal direction X along both transport planes TEA, TEB. On the other hand, however, the transport unit assembly 3Axy can be released again for movement in only one transport plane TEA, TEB. As a result, the better weight distribution of a single-action transport unit 3A can be used, for example, during movement in the (here) vertical transport plane TEA, since in this case the center of gravity is closer to the transport plane TEA than in the case of a multiple-action transport unit 3B, 3C.

The L-shaped profile of the base body 9 (in particular the legs 9B) of the double-action transport unit 3B in FIG. 1C has a center of gravity that is further away from the transport plane TEA compared to the single-action transport unit 3A in the Y direction. If the double-action transport unit 3B in FIG. 1C is moved upwards in the vertical direction Z in the first (vertical) transport plane TEA, this leads to a higher tilting moment about the longitudinal axis X than with a single-action transport unit 3A due to the force of gravity. In particular during acceleration processes (upwards in the Z direction here), under certain circumstances the tilting moment can become impermissibly high, which in the worst case could lead to the double-action transport unit 3B becoming detached from the planar motor 2A. Similarly, objects (not shown) transported with the transport units 3A-3C can also contribute in an analogous manner to a higher tipping moment due to their additional mass, which must be taken into account when designing the transport device 1 and when planning the movement of the transport units 3. Coupling single-action transport units 3A to form a transport unit assembly (or substantially to form a multiple-action transport unit) is advantageous because the transport unit group can be detached again for movement in only one transport plane TEi.

Another embodiment of a transport device 1 is shown in FIG. 6. The transport device 1 here has two planar motors 2F, 2G which are arranged at a distance from one another, wherein the two transport planes TEF, TEG are facing one another and are parallel (arrangement angle γ=0°). However, it would also be possible for the transport planes TEF, TEG to be inclined relative to one another at an arrangement angle γ≤45°, as was shown on the basis of the fifth planar motor 2E' in FIG. 1C and FIG. 1B. In each of the transport planes TEF, TEG of the planar motors 2F, 2G, single-action transport units 3A1, 3A2 are provided which can be moved two-dimensionally in the relevant transport plane TEF, TEG. As in the examples shown above, the movement is controlled via two planar motor control units (not shown) and/or via a higher-level transport unit control unit which controls the drive coils of the planar motors 2F, 2G in order to interact with the drive magnets 4 of the transport units 3A1, 3A2. Of course, the planar motors 2F, 2G in can turn also have a modular structure made up of transport segments TSi. A detailed description of the mode of operation is not given at this point.

The two transport units 3A1, 3A2 are connected by means of a connecting unit 15. The connecting unit 15 can be rigid or flexible. For example, the connecting unit 15 could have a substantially rigid rod which is connected in an articulated manner to both transport units 3A1, 3A2, as shown in FIG. 6. As already mentioned, the connecting unit 15 is preferably designed to be adjustable, so that a length of the connecting unit 15 can be changed during the movement of the transport units 3A1, 3A2. This is advantageous since the distance between the transport units 3A can change during the movement.

For example, the transport unit 3A of the first planar motor 2F can implement the indicated movement profile BPA1 and the transport unit 3A of the second planar motor 2G can implement the indicated movement profile BPA2. The two transport units 3A1, 3A2 would thus be moved substantially in opposite directions, thereby increasing the distance between the transport units 3A1, 3A2, as indicated by the length difference ΔL in FIG. 6. However, the distance could also be reduced, for example if the transport planes TEF, TEG are not arranged in parallel, but are instead arranged inclined relative to one another. In the illustrated case of the parallel transport planes TEF, TEG, the length of the connecting unit 15 is preferably adjustable between a minimum length and a maximum length. The minimum length corresponds, for example, to the distance between directly opposing transport units 3A1, 3A2 and the maximum length corresponds to the distance between the transport units 3A1, 3A2 if they are located at diagonally opposite corner points EPF, EPG of the transport planes TEF, TEG.

By the arrangement of a connecting unit 15, very complex patterns of movement can be carried out. For example, by specifying certain movement profiles BPA1, BPA2 for the two transport units 3A1, 3A2, a desired resulting movement profile of a center point MP (or any other point) of the connecting unit 15 can be generated, which results from superimposing the movement profiles BPA1, BPA2. For example, one or more receiving units 16 could also be provided on the connecting unit 15 in order to receive and transport one or more objects, for example a hook as shown. Since a planar motor 2 also enables the transport unit 3A to rotate about the vertical axis, a swiveling movement of a receiving unit 16 could also be carried out, for example, as indicated in FIG. 6 by the arrow on the transport unit 3A1 and the dashed receiving unit 16.

For example, a second pair of transport units 3B, 3A4 with a connecting unit 15 could also be provided, wherein the connecting units 15 can, of course, also be designed differently. Here, the double-action transport unit 3B and the single-action transport unit 3A4 are, for example, connected to a rigid carrier. A certain relative movement between two connecting units 15 would thus also be possible, as a result of which the flexibility of the transport device 1 can be further increased. It would be conceivable, for example, that the receiving unit 16 of one connecting unit 15 transfers an object to a receiving unit 16 of another connecting unit 15, etc. In this way, diverse movement sequences can be carried out with the transport device 1. For example, the transport units 3A1, 3A2 could be moved such that an object O1, which is transported on the second connecting unit 15, is received by means of the receiving unit 16 provided on the connecting unit 15. In the example shown, the receiving unit 16 is designed as a hook, and an eyelet for engaging the hook is arranged on the object O1. As mentioned, instead of the rigid carrier between the double-acting transport unit 3B and the single-acting transport unit 3A4, a separate planar motor 2, long-stator linear motor or a continuous conveyor could also be provided, for example. As a result, the movement of the two transport units 3B, 3A4 could be superimposed by a further or more degrees of freedom of movement.

Of course, a combination with the embodiment in FIG. 1 would also be conceivable, for example by connecting the two planar motors 2F, 2G by means of a further planar motor 2H, which forms a (lower horizontal) transport plane TEH, which is then normal to the transport planes TEF, TEG. In the transport plane TEH, for example, a single-acting transport unit 3A3 could again be provided by means of which a further object O2 is moved that can be received by the receiving unit 16 with appropriate synchronization of the movement profiles. Of course, more than two transport units 3 can also be connected by means of one or more connecting units 15, or one or more coupling devices 11 can be provided on the transport units 3. This makes it clear that, in addition to the variants shown, many other configurations are possible. The specific selection, number and combination of planar motors 2, (single and/or multi-acting) transport units 3, coupling devices 11 and connecting units 15 is of course at the discretion of a person skilled in the art.

The invention claimed is:

1. A transport device comprising at least two planar motors, each of which forms a transport plane in which at least one transport unit can be moved two-dimensionally, wherein the transport planes of the at least two planar motors are adjacent to one another and are inclined with respect to one another at a contact angle, which is 90°, with drive coils being provided on each planar motor in order to interact electromagnetically with drive magnets of a transport unit in order to move the transport unit (3) in the relevant transport plane, characterized in that wherein at least one multiple-action transport unit is provided on the transport device, wherein on the multiple-action transport unit at least first drive magnets are provided in order to interact electromagnetically with the drive coils of a first planar motor, and at least second drive magnets are provided in order to interact electromagnetically with the drive coils of a second planar motor, wherein in the transport device at least one further planar motor is provided which forms a transport plane which is directly adjacent to the transport plane of the first planar motor and is normal with respect thereto, wherein drive coils are provided on the at least one further planar motor in order to interact electromagnetically with drive magnets of a drive unit in order to move the transport unit in the relevant transport plane, and that the at least one multiple-action transport unit can be moved two-dimensionally in the transport plane of one of the planar motors or can be moved one-dimensionally in the adjacent transport planes of at least two planar motors at the same time, wherein the at least one multiple-action transport unit can be moved from the transport plane of the second planar motor via the transport plane of the first planar motor into the transport plane of the at least one further planar motor.

2. The transport device according to claim 1, wherein a double-action transport unit is provided as a multiple-action transport unit, on which is provided a base body with two legs which are arranged at an angle to one another which corresponds to the contact angle between two adjacent transport planes, wherein the first drive magnets are arranged on one leg and the second drive magnets are arranged on the other leg.

3. The transport device according to claim 1, wherein the multiple-action transport unit can be decoupled into at least two single-action transport units, wherein at least one coupling device is provided on each of the at least two single-action transport units in order to detachably couple the transport units to one another in order to form the multiple-action transport unit.

4. The transport device according to claim 1, wherein at least one planar motor control unit is provided per planar motor to control the drive coils of the relevant planar motor, wherein the planar motor control units of the at least two planar motors are connected to exchange control information for controlling transport units of the relevant planar motor and/or the planar motor control units are connected to a higher-level transport device control unit or integrated therein.

5. The transport device according to claim 1, wherein at least one planar motor is constructed from a plurality of transport segments which are adjacent to one another and together form the transport plane of the planar motor, wherein drive coils are provided on each transport segment.

6. The transport device according to claim 1, wherein in the transport device at least two planar motors with transport planes facing each other are provided, wherein at least one transport unit is provided in the transport plane of one of the planar motors and is connected by means of a connecting unit to at least one transport unit provided in the transport plane of the at least one other planar motor.

7. The transport device according to claim 6, wherein an arrangement angle which is a maximum of 45° is provided between the transport planes which face one another, wherein the arrangement angle is 0°, with the transport planes being arranged opposite and parallel to one another.

8. The transport device according to claim 6, wherein the connecting unit is adjustable in order to adapt a connecting unit length during the movement of the at least two transport units to a variable distance between the at least two transport units.

9. The method according to claim 8, wherein the at least one multiple-action transport unit is moved from the transport plane of the second planar motor into the transport plane of the first planar motor and is moved from the transport plane of the first planar motor into the transport plane of the at last one further planar motor, or vice versa.

10. A method for operating a transport device comprising at least two planar motors with transport planes that are adjacent to one another and are inclined at a contact angle of 90° relative to one another, wherein drive coils provided on the planar motors are controlled by at least one planar motor control unit, wherein at least one multiple-action transport unit is provided on the transport device, wherein on the multiple-action transport unit at least first drive magnets are provided in order to interact electromagnetically with the drive coils of a first planar motor, and at least second drive magnets are provided in order to interact electromagnetically with the drive coils of a second planar motor, wherein in the transport device at least one further planar motor is provided which forms a transport plane which is directly adjacent to the transport plane of the first planar motor and is normal with respect thereto, wherein drive coils provided on the at least one further planar motor can be controlled by a planar motor control unit, and that the at least one multiple-action transport unit is moved two-dimensionally in the transport plane of one of the planar motors or is moved one-dimensionally in the adjacent transport planes of the at least two planar motors at the same time, by controlling the drive coils of at least one of the planar motors by the corresponding planar motor control unit in order to interact with the first or second drive magnet of the multiple-action transport unit to generate a propulsive force.

11. The method according to claim 10, wherein in the region of the adjacent transport planes of two planar motors the multiple-action transport unit is decoupled into at least two single-action transport units, wherein after the decoupling the at least two single-action transport units are each moved in a one of the adjacent transport planes plane, wherein the drive coils of the planar motor of the relevant transport plane are controlled by the relevant planar motor control unit in order to interact with the drive magnets of the relevant single-action transport unit to generate a driving force.

\* \* \* \* \*